US012483071B2

(12) United States Patent
Aydin et al.

(10) Patent No.: US 12,483,071 B2
(45) Date of Patent: Nov. 25, 2025

(54) HONEYCOMB MULTI-DD COIL DESIGN FOR WIRELESS POWER TRANSFER SYSTEMS

(71) Applicant: UT-Battelle, LLC, Oak Ridge, TN (US)

(72) Inventors: Emrullah Aydin, Oak Ridge, TN (US); Erdem Asa, Oak Ridge, TN (US); Omer C. Onar, Oak Ridge, TN (US); Burak Ozpineci, Oak Ridge, TN (US)

(73) Assignees: UT-Battelle, LLC, Oak Ridge, TN (US); UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 18/823,952

(22) Filed: Sep. 4, 2024

(65) Prior Publication Data
US 2025/0096609 A1 Mar. 20, 2025

Related U.S. Application Data

(60) Provisional application No. 63/538,348, filed on Sep. 14, 2023.

(51) Int. Cl.
*H02J 50/12* (2016.01)
*H01F 27/28* (2006.01)

(52) U.S. Cl.
CPC .......... *H02J 50/12* (2016.02); *H01F 27/2823* (2013.01)

(58) Field of Classification Search
CPC ..... H02J 50/12; H02J 50/005; H01F 27/2823; H01F 38/14
See application file for complete search history.

(56) References Cited

U.S. PATENT DOCUMENTS 10,112,496 B2 * 10/2018 Nguyen ................ B60L 53/665
11,342,793 B2 *  5/2022 Goodchild .............. H02J 50/12
(Continued)

FOREIGN PATENT DOCUMENTS

CN         113315246 A  *  8/2021  ............ H02J 7/0042
WO   WO-2019180005 A1  *  9/2019  ............. A01K 47/06

OTHER PUBLICATIONS

C. Zheng et al. "Design Considerations to Reduce Gap Variation and Misalignment Effects for the Inductive Power Transfer System," IEEE Transactions on Power Electronics, 30(11), 6108-6119, 2015.
(Continued)

*Primary Examiner* — Rexford N Barnie
*Assistant Examiner* — Michael J Warmflash
(74) *Attorney, Agent, or Firm* — Fox Rothschild LLP

(57) ABSTRACT

A coil, comprising: a wire wound to form a plurality of double-D (DD) sub-coils, each said DD sub-coil having a plurality of sides defining one of a plurality of hexagonal shaped segments arranged to define a honeycomb structure; wherein a magnetic field is created when current passes through the plurality of DD sub-coils, the plurality of DD sub-coils being configured so that when activated the current flows in a same first direction through adjacent sides of first and second ones of the plurality of DD sub-coils, flows in a same second direction through adjacent sides of first and third ones of the plurality of DD sub-coils, and flows in a same third direction through adjacent sides of the second and third ones of the plurality of coils.

15 Claims, 13 Drawing Sheets

(56) References Cited

U.S. PATENT DOCUMENTS

| | | | | |
|---|---|---|---|---|
| 11,456,628 | B2* | 9/2022 | Goodchild | H02J 50/80 |
| 12,322,984 | B1* | 6/2025 | Molina | H02J 50/12 |
| 2011/0101788 | A1* | 5/2011 | Sun | H01F 38/14 |
| | | | | 307/104 |
| 2013/0293025 | A1* | 11/2013 | Xu | H02J 50/402 |
| | | | | 307/104 |
| 2014/0091640 | A1* | 4/2014 | Scholz | H04B 5/79 |
| | | | | 307/104 |
| 2017/0207019 | A1* | 7/2017 | Pichkur | H01F 38/14 |
| 2018/0287415 | A1* | 10/2018 | Saita | H02J 50/10 |
| 2019/0039471 | A1* | 2/2019 | Moghe | B60L 53/38 |
| 2021/0028649 | A1* | 1/2021 | Ren | H10K 59/121 |
| 2021/0028655 | A1* | 1/2021 | Goodchild | H02J 7/00712 |
| 2021/0028656 | A1* | 1/2021 | Goodchild | H02J 7/0047 |
| 2021/0188106 | A1* | 6/2021 | Asa | H02M 1/4216 |
| 2021/0210994 | A1* | 7/2021 | Nerheim | H02J 7/04 |
| 2022/0052557 | A1* | 2/2022 | Goodchild | H02J 50/402 |
| 2022/0242258 | A1* | 8/2022 | Mohammad | H01F 38/14 |
| 2023/0044989 | A1* | 2/2023 | Goodchild | H02J 50/90 |
| 2024/0094426 | A1* | 3/2024 | Kanakasabai | H02J 50/402 |

OTHER PUBLICATIONS

J. Sallen, J. L. Villa, A. Llombart, and J. F. Sanz, "Optimal design of ICPT systems applied to electric vehicle battery charge," IEEE. Trans. Ind. Electron., vol. 56, No. 6, pp. 2140-2149, Jun. 2009.

O. C. Onar et al., "A 100-kW Wireless Power Transfer System Development Using Polyphase Electromagnetic Couplers," 2022 IEEE Transportation Electrification Conference & Expo (ITEC), Anaheim, CA, USA, 2022, pp. 273-278.

E. Aydin, M.T. Aydemir, "A 1-kw wireless power transfer system for electric vehicle charging with hexagonal flat spiral coil," Turk. J. Electr. Eng. Comput. Sci., 29, 2346-2361, 2021.

M. Budhia, J. T. Boys, G. A. Covic, and C.-Y. Huang, "Development of a single-sided flux magnetic coupler for electric vehicle IPT charging systems," IEEE Trans. Ind. Electron., vol. 60, No. 1, pp. 318-328, Jan. 2013.

F. Y. Lin, G. Covic, and J. Boys, "Evaluation of magnetic pad sizes and topologies for electric vehicle charging," IEEE Trans. Power Electron., vol. 30, No. 11, pp. 6391-6407, Nov. 2015.

M. Budhia, G. A. Covic, J. T. Boys, and C.-Y. Huang, "Development and evaluation of single sided flux couplers for contactless electric vehicle charging," in Proc. IEEE Energy Conv. Congr. Expo., Phoenix, AZ, USA, Sep. 17-22, 2011, pp. 614-621.

P. Tan, T. Peng, X. Gao, B. Zhang, "Flexible Combination and Switching Control for Robust Wireless Power Transfer System with Hexagonal Array Coil," IEEE Transactions on Power Electronics, 36, 3868-3882, 2021.

* cited by examiner

HONEYCOMB MULTI-DD COIL DESIGN FOR WIRELESS POWER TRANSFER SYSTEMS

CROSS-REFERENCE TO RELATED APPLICATION(S)

The present application claims priority to and the benefit of U.S. Provisional Patent Application Ser. No. 63/538,348 which was filed on Sep. 14, 2023. The content of this Provisional Patent Application is incorporated by reference in its entirety.

STATEMENT REGARDING FEDERALLY SPONSORED RESEARCH AND DEVELOPMENT

The technologies described herein were developed with government support under Contract No. DE-AC05-00OR22725 awarded by the U.S. Department of Energy. The government has certain rights in the described technologies.

BACKGROUND

Description of the Related Art

Wireless power transfer (WPT) technology can be used in a wide power range for different type of battery-powered applications such as manned and unmanned aerial vehicles, electric vehicles (marine, underwater, on-the-road, off-road, non-road, rail, space), portable electronics, and space applications. WPT is a safe, flexible, and convenient method for charging batteries since there is no physical connection between primary and secondary coils. The primary and secondary coils are magnetically coupled, and efficient power transfer is enabled by much stronger coupling. Coil design is an important part of a WPT system since the coil design's characteristics determine the magnetic coupling between the primary and secondary sides of the WPT system. In addition to charging, WPT can also be used to power equipment connected to the secondary coil.

SUMMARY

The present disclosure concerns a coil. The coil comprises a wire wound to form a plurality of double-D (DD) sub-coils, each said DD sub-coil having a plurality of sides defining one of a plurality of hexagonal shaped segments arranged to define a honeycomb structure. A magnetic field is created when current passes through the plurality of DD sub-coils. The plurality of DD sub-coils are configured so that when activated the current flows in a same first direction through adjacent sides of first and second ones of the plurality of DD sub-coils, flows in a same second direction through adjacent sides of first and third ones of the plurality of DD sub-coils, and flows in a same third direction through adjacent sides of the second and third ones of the plurality of coils.

The present disclosure also concerns a wireless power transfer (WPT) system for wirelessly providing high-frequency AC power to a load. The WPT system comprises: a transmitter comprising a transmitter pad configured to wirelessly transfer the high-frequency AC power, the transmitter pad comprising a first coil; and a receiver comprising a receiver pad configured to receive the high-frequency AC power when the transmitter pad and the receiver pad are disposed adjacent to each other and spaced apart by a gap, the receiver pad comprising a second coil. Each of the first and second coils comprises a wire wound to form a plurality of DD sub-coils, each said DD sub-coil having a plurality of sides defining one of a plurality of hexagonal shaped segments arranged to define a honeycomb structure. A magnetic field is created when current passes through the plurality of DD sub-coils. The plurality of DD sub-coils are configured so that when activated the current flows in a same first direction through adjacent sides of first and second ones of the plurality of DD sub-coils, flows in a same second direction through adjacent sides of first and third ones of the plurality of DD sub-coils, and flows in a same third direction through adjacent sides of the second and third ones of the plurality of coils.

BRIEF DESCRIPTION OF THE DRAWINGS

The present solution will be described with reference to the following drawing figures, in which like numerals represent like items throughout the figures.

DETAILED DESCRIPTION

Figure 1:
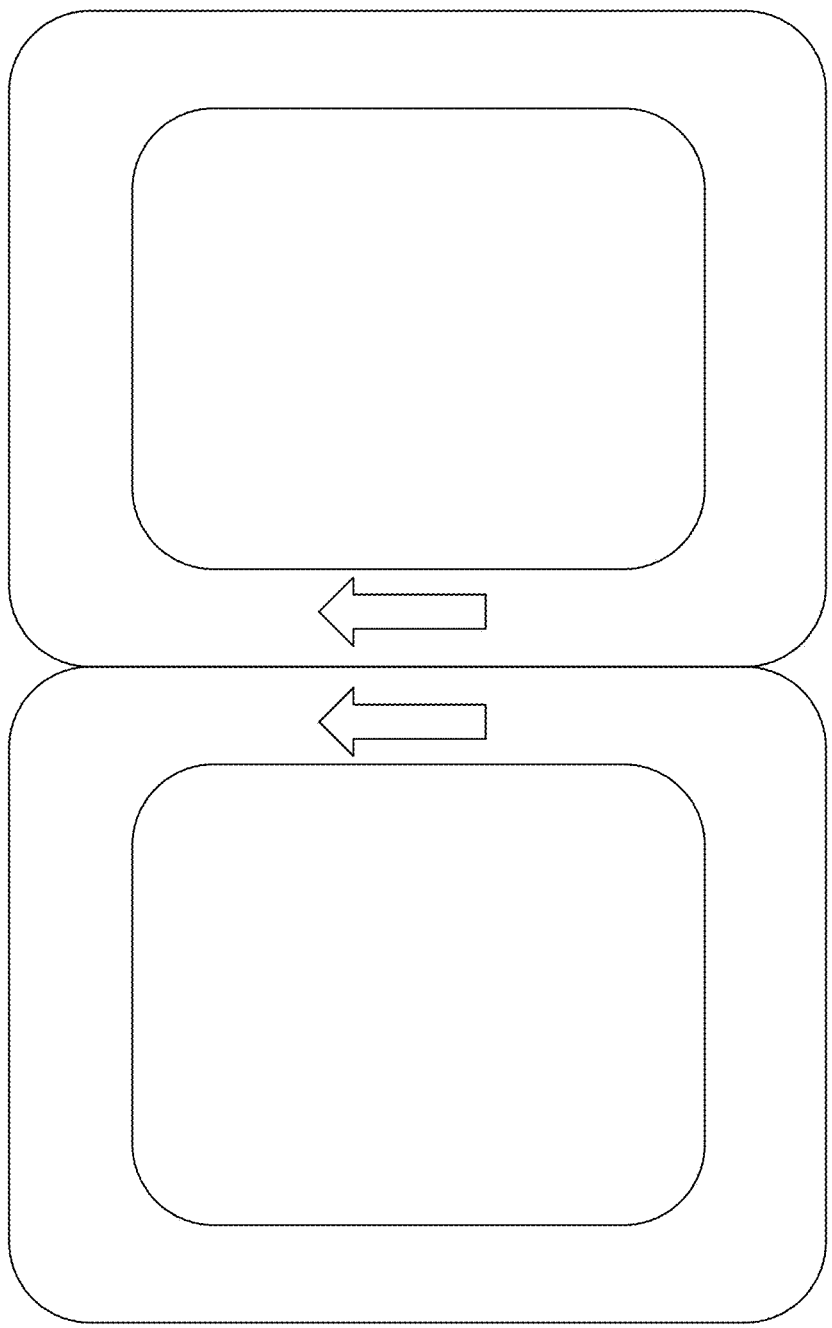
FIG. 1 provides an illustration of a conventional DD coil.

As noted above, coil design is an important part of a WPT system since the coil design's characteristics determine the magnetic coupling between the primary and secondary sides of the WPT system. Different conventional coil designs have been proposed to obtain better coupling under perfect alignment conditions or misaligned conditions. Examples of conventional coil designs are circular, rectangular, or hexagonal. Other conventional, but more advanced, coil designs are double D (DD), quadrature DD (DDQ), and bipolar power pad (BPP) coils. FIG. 1 shows that a conventional DD coil design has a main flux path in the middle to allow strong coupling with a similar shaped secondary side coil. The conventional coil designs have been used especially for single primary and secondary coil WPT systems.

Figure 2:
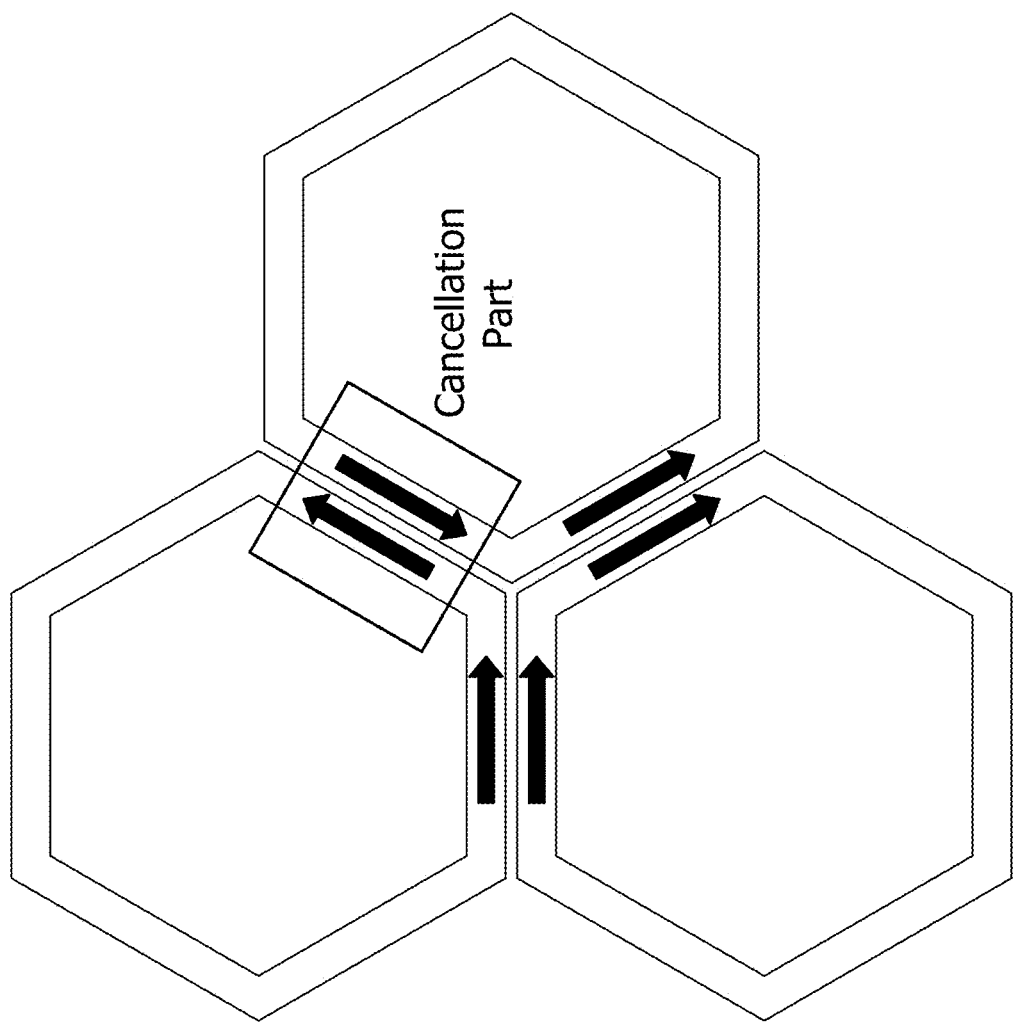
FIG. 2 provides an illustration of a conventional honeycomb coil array.

Note that some conventional WPT systems use multiple primary and secondary for more flexibility, modularity, misalignment tolerance, and for reaching higher power levels. For a coil array, hexagonal coils advantageously use the total area more effectively, while circular coils can have dead flux regions between each other. However, a hexagonal coil array, aka honeycomb, has cancellation parts due to opposite current flow directions, as shown in FIG. 2.

The cancelation parts can weaken the coupling between primary and secondary. As a solution, separately excited coils can be used for a honeycomb. In this case, each coil needs to be excited separately and a complicated switching control is needed.

WPT technology has received significant attention recently as an alternative charging method for batteries in a wide range of power levels. Different coil shapes and system structures have been proposed as noted above. Honeycomb coil arrays, which are used conventionally for low-power applications, have not been used for mid and high-power level applications. To address this power range, a honeycomb multi-DD coil design is described herein for wireless battery charging systems. Also, described below are finite element analysis (FEA) results and performance characteristics of a 100 kW WPT system developed in the laboratory for validation purposes. In addition, the misalignment tolerance of the disclosed system is discussed herein for different positioning of the secondary coil. It is shown that the disclosed honeycomb coil array is amenable for wireless power applications where achieving high coupling and high-misalignment tolerance are important attributes for overall performance.

Figure 3:
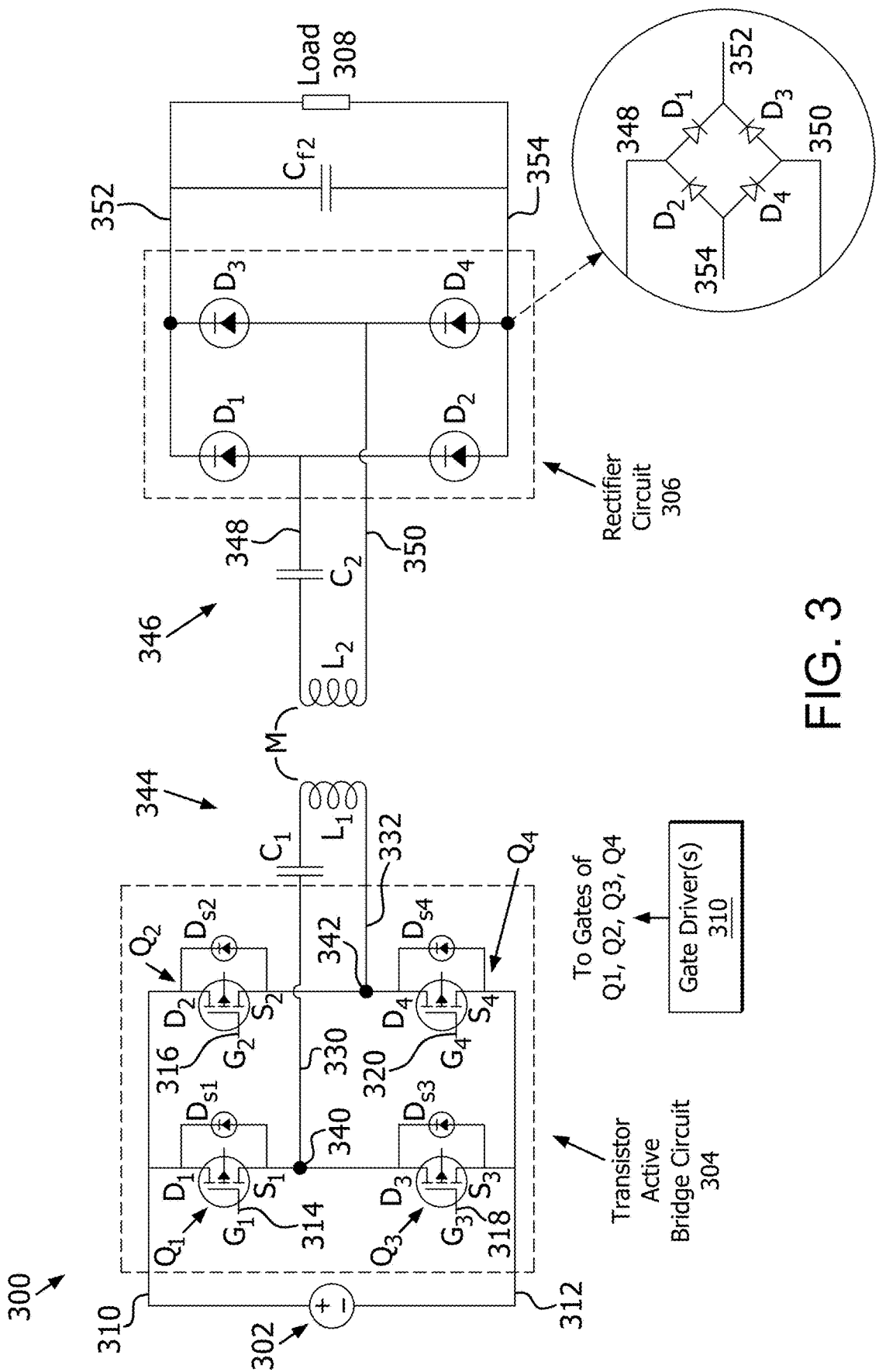
FIG. 3 provides a circuit diagram for a WPT system.

In WPT systems, the voltage is induced on the secondary side by the high frequency current flowing through the primary coil. High power transfer efficiency can be obtained by using a compensation topology to eliminate, or at least reduce, the reactive power and choosing the correct compensation topology is important in terms of efficiency and misalignment tolerance. It has been shown that a series-series (SS) topology requires less copper use compared to other conventional topologies. Additionally, the SS topology, with independency of the compensation capacitors on the magnetic coupling and load resonance frequency, has more misalignment tolerance. Because of these advantages, disclosed technologies are described in the context of the SS topology. However, the present solution can be used with any type of compensation topology for resonant networks on the transmitter and the receive sides. FIG. 3 shows a lumped structure of an SS compensated WPT system 300. In FIG. 3, the circuits are shown with MOSFETs but any active switches could be used instead of the MOSFETs.

WPT system 300 comprises a power source 302, a transistor active bridge circuit 304, and a rectifier circuit 306. The transistor active bridge circuit 304 can include a high frequency inverter. The transistor active bridge circuit 304 may be configured to perform DC-to-AC conversion. The transistor active bridge circuit 304 is supplied a voltage waveform from power source 302. The voltage waveform can be a DC voltage waveform. As such, the transistor active bridge circuit 304 is connectable to voltage source 302 via two (2) input lines 310, 312. The transistor active bridge circuit 304 is also connected between a pair of output lines 330, 332. The output lines 330, 332 can be connected across an LC circuit 340 so that the LC circuit 340 can be supplied an output voltage by the transistor active bridge circuit 304.

The transistor active bridge circuit 304 includes a plurality of metal-oxide semiconductor field-effect transistors (MOSFETs) $Q_1$, $Q_2$, $Q_3$, $Q_4$ of a P-channel type (as shown) or an N-channel type (not shown). The MOSFET may be an enhancement mode MOSFET MOSFET or any other kind of active semiconductor switch.

Each MOSFET $Q_1$, $Q_2$, $Q_3$, $Q_4$ has three (3) terminals respectively defined as a source, a gate and a drain. With regard to MOSFET $Q_1$, the source, gate and drain terminals are respectively identified with references $S_1$, $G_1$ and $D_1$. With regard to MOSFET $Q_2$, the source, gate and drain terminals are respectively identified with references $S_2$, $G_2$ and $D_2$. The source, gate and drain terminals of the MOSFETs $Q_3$ and $Q_4$ are respectively identified as $S_3$, $G_3$, $D_3$ and $S_4$, $G_4$, $D_4$.

An electrical path is provided from the source to the drain of each MOSFET $Q_1$, $Q_2$, $Q_3$, $Q_4$. This path is generally referred to herein as the source-drain path. A source-drain path of first MOSFET $Q_1$ is connected in series with a source-drain path of the second MOSFET $Q_3$. The series connected transistor pair $Q_1$, $Q_3$ form a first series transistor combination that is connected across the input lines 310, 312. A source-drain path of MOSFET $Q_2$ is connected in series with a source-drain path of MOSFET $Q_4$ to form a second series transistor combination connected across the input lines 310, 312.

The transistor active bridge circuit 304 can have an output defined by output lines 330, 332. A first one of the output lines 330 can be connected to the first series combination $Q_1$, $Q_3$ at an interconnection point 340 between field-effect transistors $Q_1$, $Q_3$. A second one of the output lines 332 can be connected to the second series combination $Q_2$, $Q_4$ at an interconnection point 342 between the field-effect transistors $Q_2$, $Q_4$.

A gate driver circuit 310 is provided for the MOSFETs $Q_1$, $Q_2$, $Q_3$, $Q_4$. The gate driver circuit 310 is generally configured to supply a voltage to the gate $G_1$, $G_2$, $G_3$, $G_4$ of each MOSFET $Q_1$, $Q_2$, $Q_3$, $Q_4$ at certain times for switching the MOSFET to its "on" state or "off" state. The voltage applied to the gate $G_1$, $G_2$, $G_3$, $G_4$ of a respective MOSFET $Q_1$, $Q_2$, $Q_3$, $Q_4$ has an "on state" or "off state" voltage value selected in accordance with a particular field-effect transistor application. The gate driver circuit 310 is also generally configured to stop supplying the voltage to the gate $G_1$, $G_2$, $G_3$, $G_4$ of each MOSFET $Q_1$, $Q_2$, $Q_3$, $Q_4$ at certain times for switching the MOSFET to its "on" state or "off" state. Gate driver circuits are well known. Known or to be known gate driver circuit can be used here.

The transistor active bridge circuit 304 further include devices for ensuring that each of the MOSFETs $Q_1$, $Q_2$, $Q_3$, $Q_4$ is switched to its "on" states and/or "off" states at desirable times.

The operation of the transistor active bridge circuit 304 will now be described. In some scenarios, one MOSFET is switched to its "on" state while the other three MOSFETs are in their "off" states. In other scenarios, two MOSFETs (one in each series pair of transistors) are concurrently or simultaneously switched to their "on" states while the other two MOSFETs are in their "off" states. The latter case will be discussed in more detail below.

When the gate driver circuit 310 communicates gate control signals to the MOSFETs $Q_1$, $Q_4$, the MOSFETs $Q_1$, $Q_4$ will be biased and switch to their "on" states. In effect, current will flow between the drain $D_1$, $D_4$ and source $S_1$, $S_4$ of these MOSFETs $Q_1$, $Q_4$. The MOSFETs $Q_1$, $Q_4$ transition back to their "off" states when the gate control signal is no longer being output from the gate driver circuit 310.

Similarly, the gate driver circuit 310 communicates gate control signals to the MOSFETs $Q_2$, $Q_3$, the MOSFETs $Q_2$, $Q_3$ will be biased and switched to their "on" states. In effect, current will flow between the drain $D_2$, $D_3$ and source $S_2$, $S_3$ of these MOSFETs $Q_2$, $Q_3$. The MOSFETs $Q_2$, $Q_3$ transition back to their "off" states when the gate control signal is no longer being output from the gate driver circuit 310.

The gate driver circuit 310 may be configured to prevent the two MOSFETs in each series pair $Q_1/Q_4$ and $Q_2/Q_3$ from being turned "on" simultaneously or concurrently. The MOSFETs $Q_1$, $Q_2$, $Q_3$, $Q_4$ are switched by the gate driver circuit 310 to provide a certain power output across output lines 330, 332.

The output lines 330, 332 are connected across an LC circuit 344. LC circuit 344 comprises a compensation capacitor $C_1$ and an inductor $L_1$. Inductor $L_1$ comprises a primary inductive coil, which is positioned adjacent to a secondary inductive coil $L_2$. The secondary inductive coil $L_2$ is electrically connected to a compensation capacitor $C_2$. M shows the mutual inductance of the coils $L_1$ and $L_2$. Coil $L_2$ and capacitor $C_2$ provide an LC circuit 346. LC circuit 346 is electrically connected to the rectifier circuit 306. This is called a series-series compensation network. Other compensation network can also be used in this circuit.

Rectifier circuit 306 is configured to convert an AC voltage to a DC voltage. In this regard, the rectifier circuit 306 comprises diodes $D_1$, $D_2$, $D_3$, $D3_4$ arranged in a bridge configuration. The AC signal is supplied to the rectifier circuit 306 via input lines 348, 350. The output signal is provided to the load 308 via output lines 352, 354. A capacitor $C_{f2}$ is connected across output lines 348, 350 between the rectifier circuit 306 and the load 308. Capacitor $C_{f2}$ is provided to smooth the output waveform such that it is similar to a DC voltage waveform.

Operation of such a rectifier circuit will now be described. In a positive half cycle of the AC signal, diodes $D_2$ and $D_3$ are forward biased and diodes $D_1$ and $D_4$ are reversed biased. As such, diodes $D_2$, $D_3$ are conducting and diodes $D_1$, $D_4$ are not conducting. Current flows through capacitor $C_{f2}$. In effect, the capacitor $C_{f2}$ is charged via diodes $D_1$, $D_4$ during the positive half cycle of the AC signal. The output voltage is positive on output line 352 and negative on output line 354.

In a negative half cycle of the AC signal, diodes $D_1$ and $D_4$ are forward biased and diodes $D_2$, $D_3$ are reversed biased. Accordingly, diodes $D_1$, $D_4$ are conducting while diodes $D_2$, $D_3$ are not conducting whereby the negative half cycle of the AC signal is inverted. Therefore, the output voltage is once again positive on output line 352 and negative on output line 354. The capacitor $C_{f2}$ discharges through the load 308. Instead of diodes, active semiconductor switches can also be used to control the voltage output of the rectifier or for bi-directional operation.

The target output power for the proposed system may vary from a few KW to a few hundred kW and the relationship of current, voltage and desired power is given in equation (1).

$$P = \frac{4}{\sqrt{2\pi}} V_{dc} I \quad (1)$$

where $V_{dc}$ shows the DC-link voltage. The required current value is calculated from mathematical equation (1). If $V_{dc}$ is set to 700 V, then the required current value is 159 Arms for the primary and secondary sides since the coils are considered identical on both sides. The transferred power equation is given in the following mathematical equation (2).

$$P = \omega M I^2 \quad (2)$$

The required mutual inductance value may be calculated as M=7.4 µH. The currents are equal for primary and secondary coils since they are identical.

The operating frequency may be selected as 85 kHz or another frequency in some scenarios. It should be noted that 85 kHz is the most commonly used frequency for this type of application. However, the present solution is not limited in this regard.

The magnetic design of WPT systems is the most important part to achieve high power efficiencies. The coil and core geometries can be in different shapes and types. By using only a single wire and winding it by considering the current directions, the coils $L_1$ and $L_2$ can be created without any flux cancellations. The wire can include, but is not limited to, a 2 AWG litz wire selected to have a less than J=5 $A/mm^2$ current density. The core may include, but is not limited to, a 5 mm thickness core material. The dimensions of the core may be the same as the outer dimensions of the coil pads.

Figure 4:
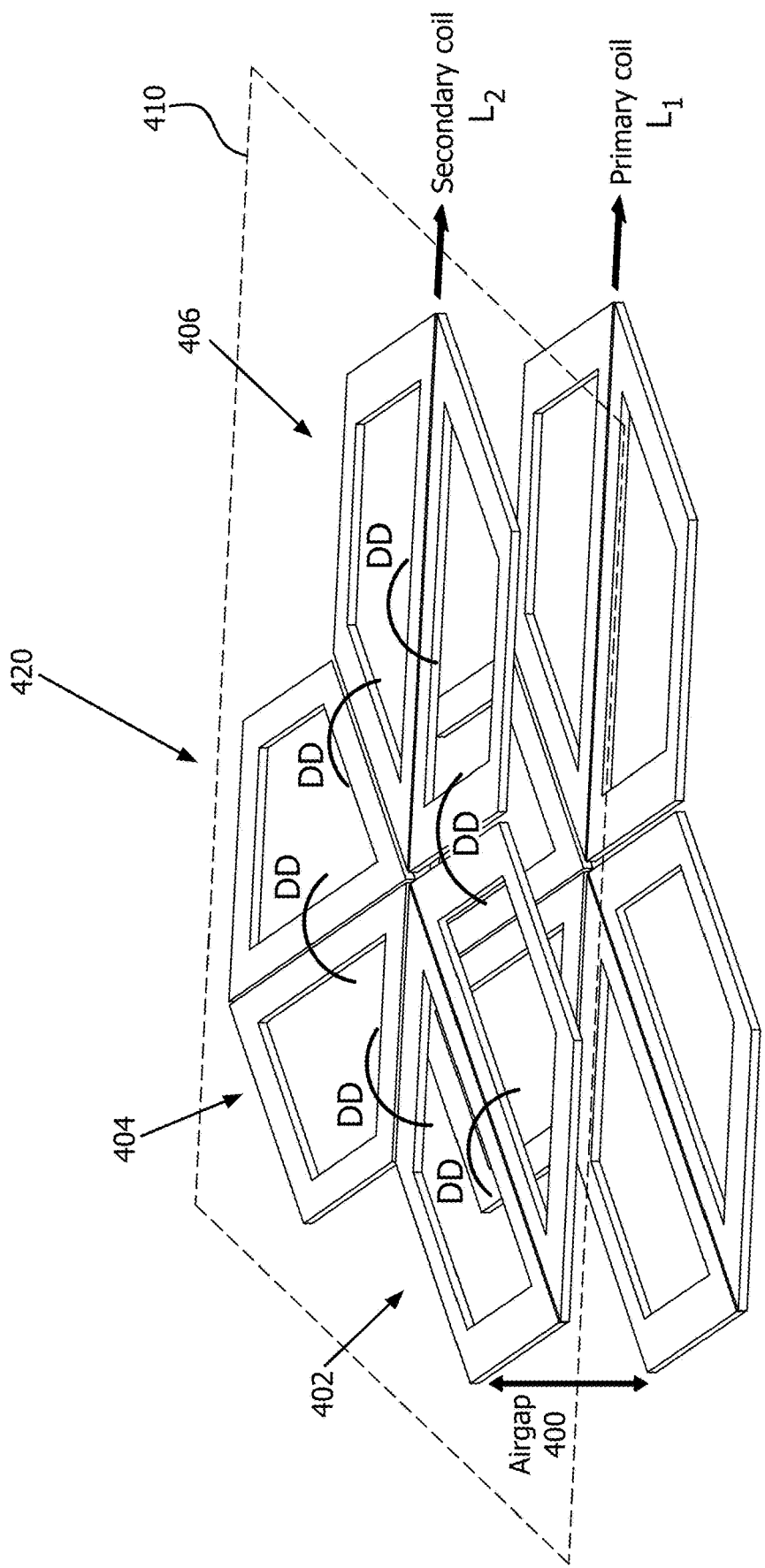
FIG. 4 provides an illustration of two adjacent multi-DD coil structures.

An illustration is provided in FIG. 4 of an architecture of a bulk design for the primary and secondary coils $L_1$ and $L_2$. FIG. 4 shows a perspective view of the two coils. The coils $L_1$ and $L_2$ are separated by an air gap 400. Each coil $L_1$, $L_2$ comprises three segments 402, 404, 406 that are arranged to reside adjacent to each other in a plane 410. The three segments 402, 404, 406 provide a novel honeycomb multi-DD coupling structure 420. A top view of the novel honeycomb multi-DD coupling structure 420 is provided in FIG. 5. The three segments 402, 404, 406 form three DD sub-coils having a honeycomb arrangement. In this regard, the three DD sub-coils are rotated a certain degrees from the other DD sub-coils. For example, DD sub-coil 404 is rotated by −120 degrees relative to DD sub-coil 402. The rotational degree and the coil shape can be different for other applications. As such, an angle $\alpha_1$ of 120° exits between center lines 520, 522 of segments 402, 404. Similarly, DD sub-coil 406 is rotated by +120 degrees relative to DD sub-coil 402. As such, an angle $\alpha_2$ of 120° exits between center lines 520, 524 of segments 402, 406. In this way, the honeycomb multi-DD coupling structure 420 is configured to (i) address the shortcomings of the conventional honeycomb coil array, and (ii) combines the advantages of the DD coil design and the honeycomb array design.

Figure 6:
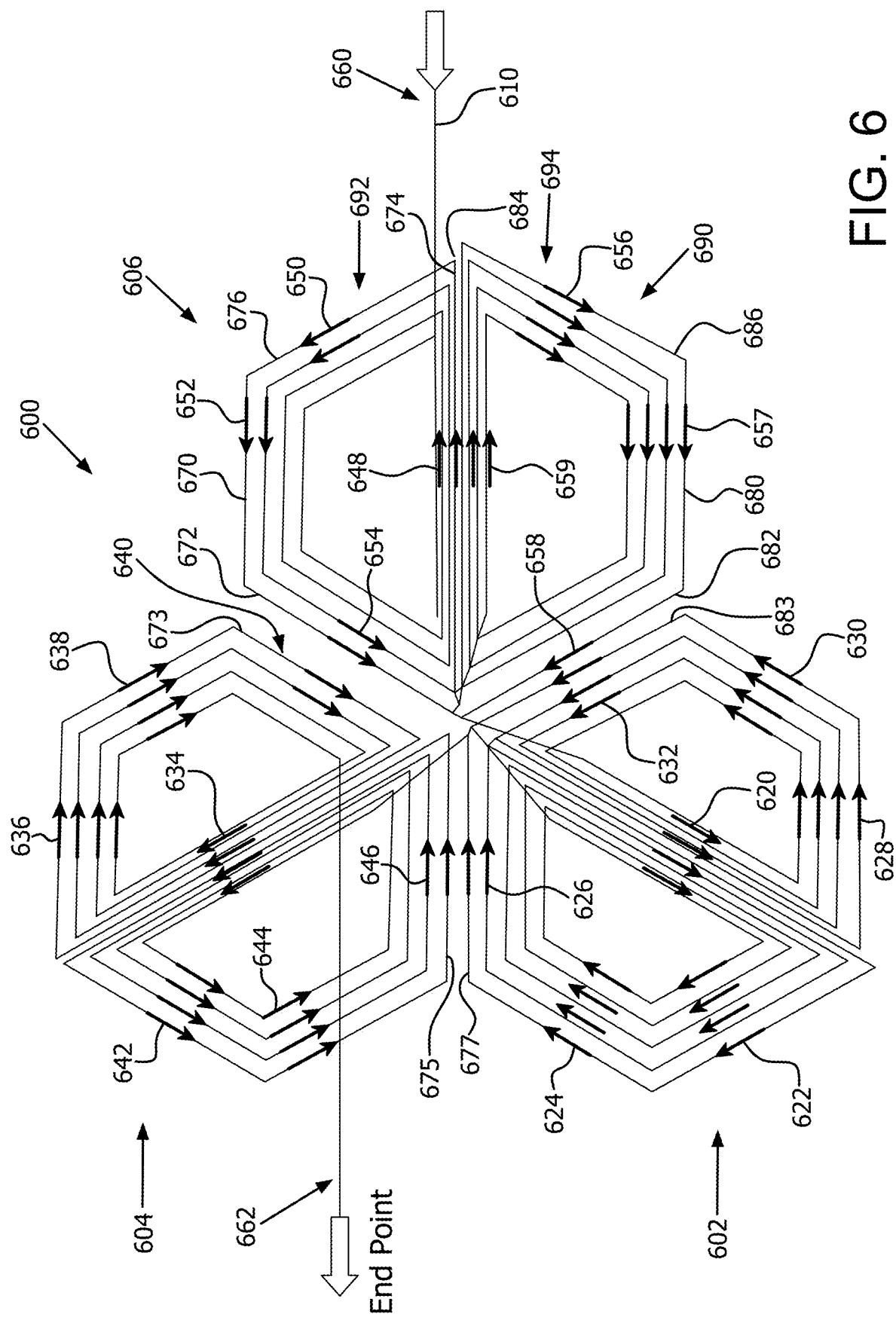
FIG. 6 provides a top view of a multi-DD coil structure that is useful for understanding how a wire is wound to form the same.

By using only a single wire and wiring it in a particular way that considers current directions, the present solution results in a novel coil design without any flux cancellations. FIG. 6 shows the novel design for a honeycomb multi-DD coil structure 600 including the wiring with its current directions shown by arrows 620, 622, 624, 626, 628, 630, 632, 634, 636, 638, 640, 642, 644, 646, 648, 650, 652, 654, 656, 658. The starting and ending points 660, 662 of the wire are also shown in FIG. 6. Coils $L_1$ and/or $L_2$ can be the same as or similar to the honeycomb multi-DD coil structure 600 shown in FIG. 6. Segment 402 of FIG. 4 may correspond to segment 602 of FIG. 6. Segment 404 of FIG. 4 may correspond to segment 604 of FIG. 6. Each segment 602, 604, 606 may also be referred to herein as a double-D (DD) coil. At least three DD sub-coils are provided in the multi-DD coil structure 600. The DD sub-coils are generally formed to have a honeycomb arrangement in which each DD sub-coil is rotated by +120° and −120° relative to the other two DD sub-coils, respectively.

Each segment 602, 604, 606 comprises a portion of the wire 610 forming a plurality of interconnected and concentric hexagonal structures 690. For example, each segment comprises four hexagonal structures as shown with a same center. The present solution is not limited to the particulars of this example. Each segment can have any number of hexagonal structures selected in accordance with a given application.

Each hexagonal structure 690 has two halves 692, 694. The wire 610 is arranged such that current flows in a counter-clockwise direction through half 692 and flows in a clockwise direction through half 694.

Half 692 comprises a portion of the wire 610 arranged in a generally quadrilateral shape defined by four straight sides 670, 672, 674, 676. The wire 610 is arranged such that current flows in direction 650 on side 676, direction 652 on side 670, direction 654 on side 672, and direction 648 on side 674. Similarly, half 694 comprises a portion of the wire 610 arranged in a generally quadrilateral shape defined by four straight sides 680, 682, 684, 686. The wire 610 is arranged such that current flows in direction 656 on side 686, direction 657 on side 680, direction 658 on side 682, and direction 659 on side 684. Directions 648, 659 are the same. Directions 652, 657 are the same. Directions 650, 658 are the same. Directions 654, 656 are the same. Side 674 of half 692 is located adjacent to and extends parallel to side 684 of half 694. The wire is arranged such that current flows in the same direction shown by arrows 648, 659 through adjacent/parallel sides 674, 684 of the two halves 692, 694 of the hexagonal structure 690.

The segments 602, 604, 606 are arranged relative to each other such that one side of each segment extends parallel to an adjacent side of another one of the segments. For example, side 672 of segment 606 is located adjacent to and extends parallel to side 673 of segment 604, and side 682 of segment 606 is located adjacent to and extends parallel to side 683 of segment 602. Side 675 of segment 604 is located adjacent to and extends parallel to side 677 of segment 602. The wire 610 is arranged such that: current flows in the same direction shown by arrows 640, 654 in adjacent/parallel sides 672, 673 of segments 604, 606; current flows in the same direction shown by arrows 632, 658 in adjacent/parallel sides 682, 683 of segments 602, 606; and current flows in the same direction shown by arrows 626, 646 in adjacent/parallel sides 675, 677 of segments 602, 604.

Figure 5:
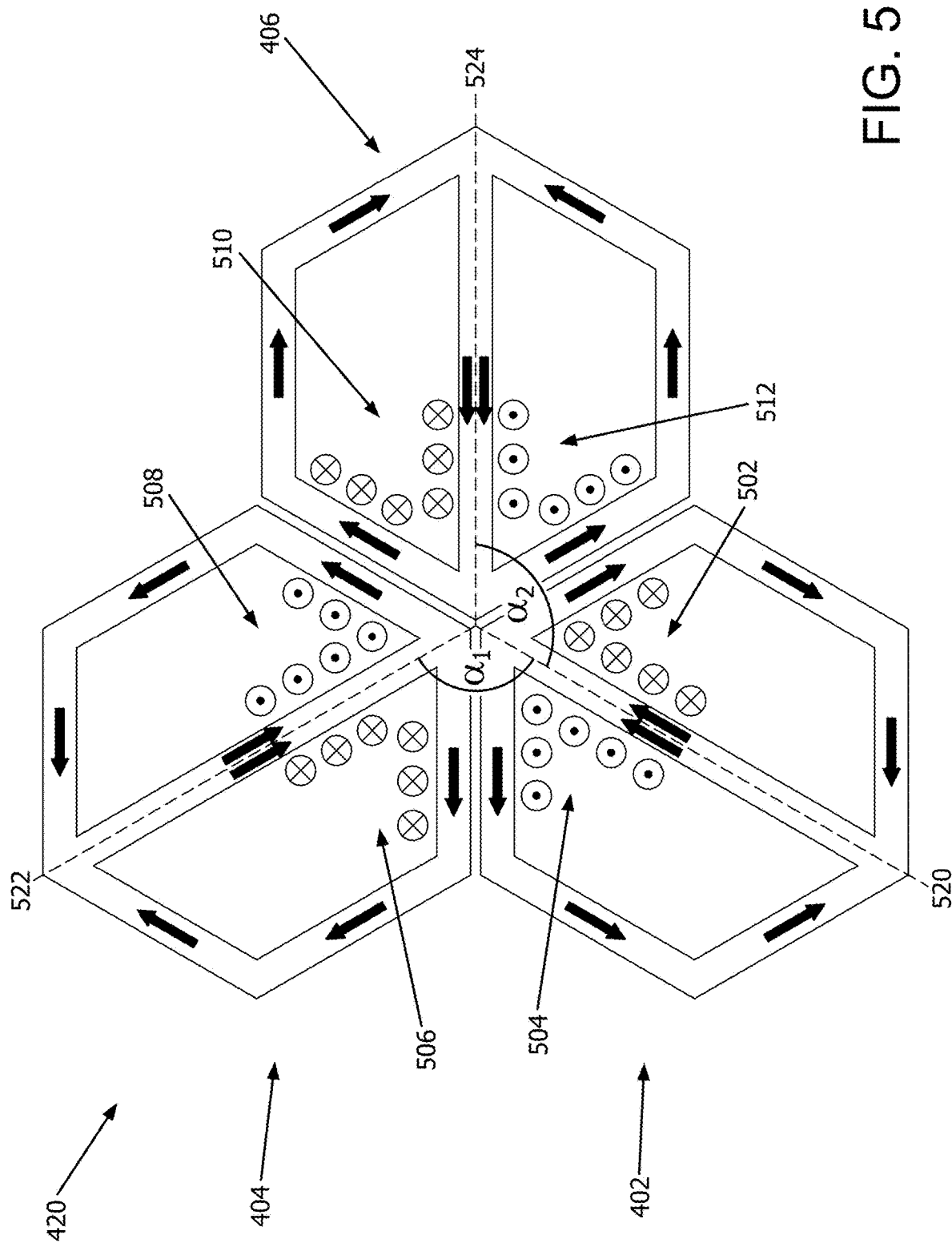
FIG. 5 provides a top view of a multi-DD coil structure.
Figure 7:
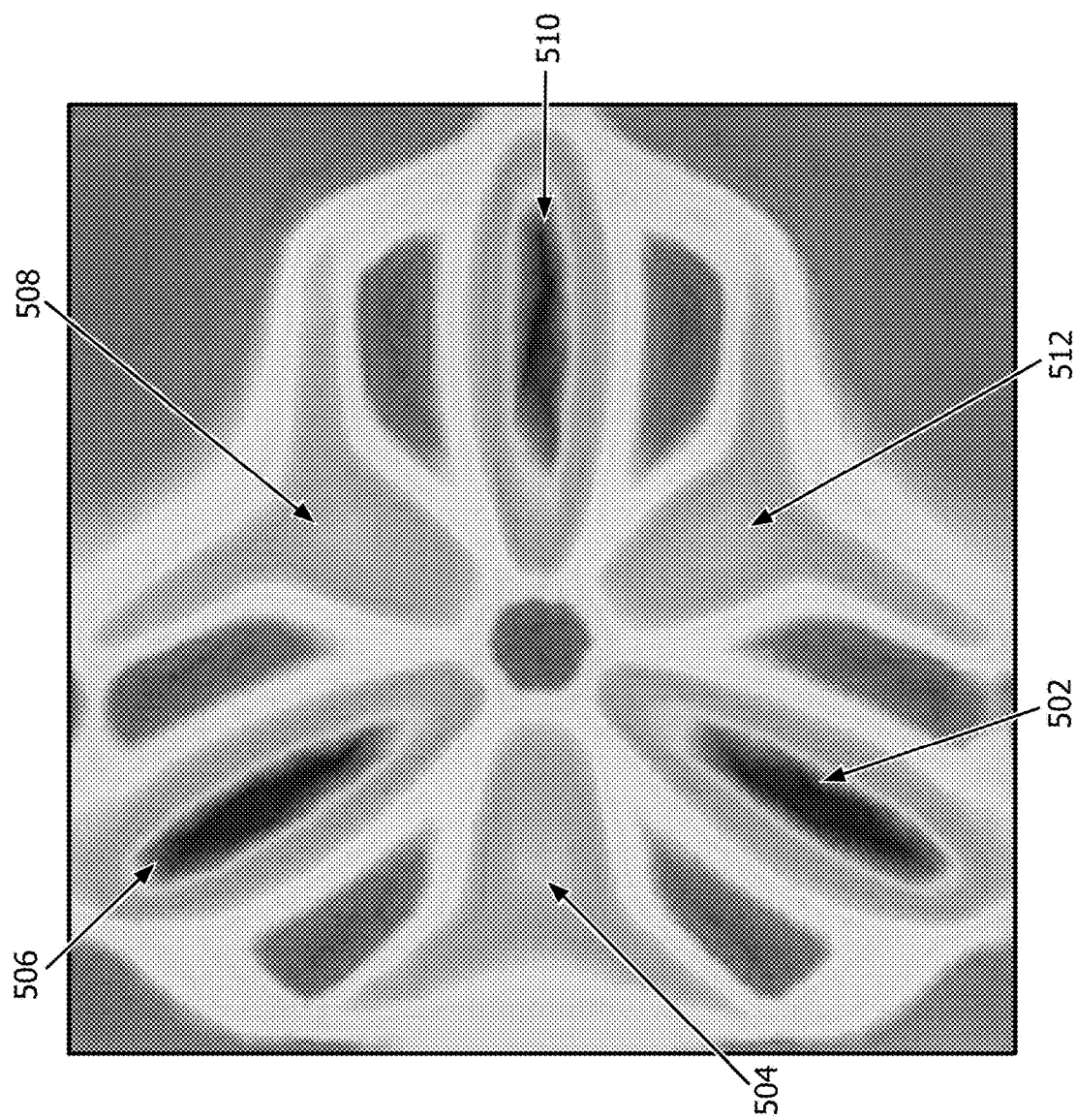
FIG. 7 provides an illustration showing a magnetic field distribution on the receiver side core material.
Figure 7:
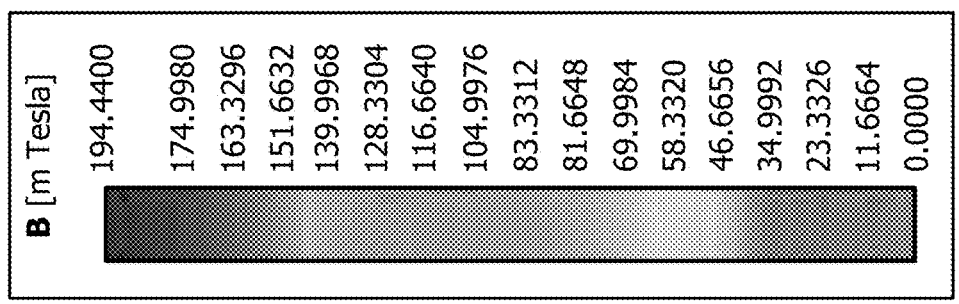

The novel coil design of FIGS. 5-6 can produce concentrated magnetic flux at six points 502, 504, 506, 508, 510, 512. In contrast, only one concentric magnetic flux is produced by a conventional DD. FIG. 7 shows the DD flux concentrations of the six points. Current directions for each point of the disclosed design are shown in FIGS. 4-5.

Using the present design on both primary and secondary coils results in improved coupling. Therefore, the coupling factor is improved not only in a section of the coil pad but within the pad's entire surface area. The present coupling structure can provide better coupling factor, higher power transfer distance, higher misalignment tolerance, and less leakage flux relative to conventional coil designs. In addition, by using only a single coil and creating a multiple coil array with concentrated flux points, not only provides a better magnetic coupling, but also reduces the number of control components and switching. Since the main flux length is proportional to the diameter of the primary coil, the disclosed design may be used to increase the main flux length by adding new coils. Furthermore, this coil design can be easily adopted to polyphase coil structure, which is the most promising coil design as of now especially for high power and fast charging applications of EVs.

The present honeycomb multi-DD coil design also introduces additional opportunities to increase power levels and have higher misalignment tolerances. While a single H-bridge inverter can be used to drive this system, a three-phase inverter can be used to generate rotating magnetic fields as in the polyphase system by connecting the 3 honeycomb coils in delta or star wiring. Similarly, 3 separate H-bridge inverters can be used in parallel to drive a single wire system for increased power with non-rotating fields, or 3 separate H-bridge can be configured to drive each honeycomb coil with rotating fields in an open-ended winding configuration.

Figure 8:
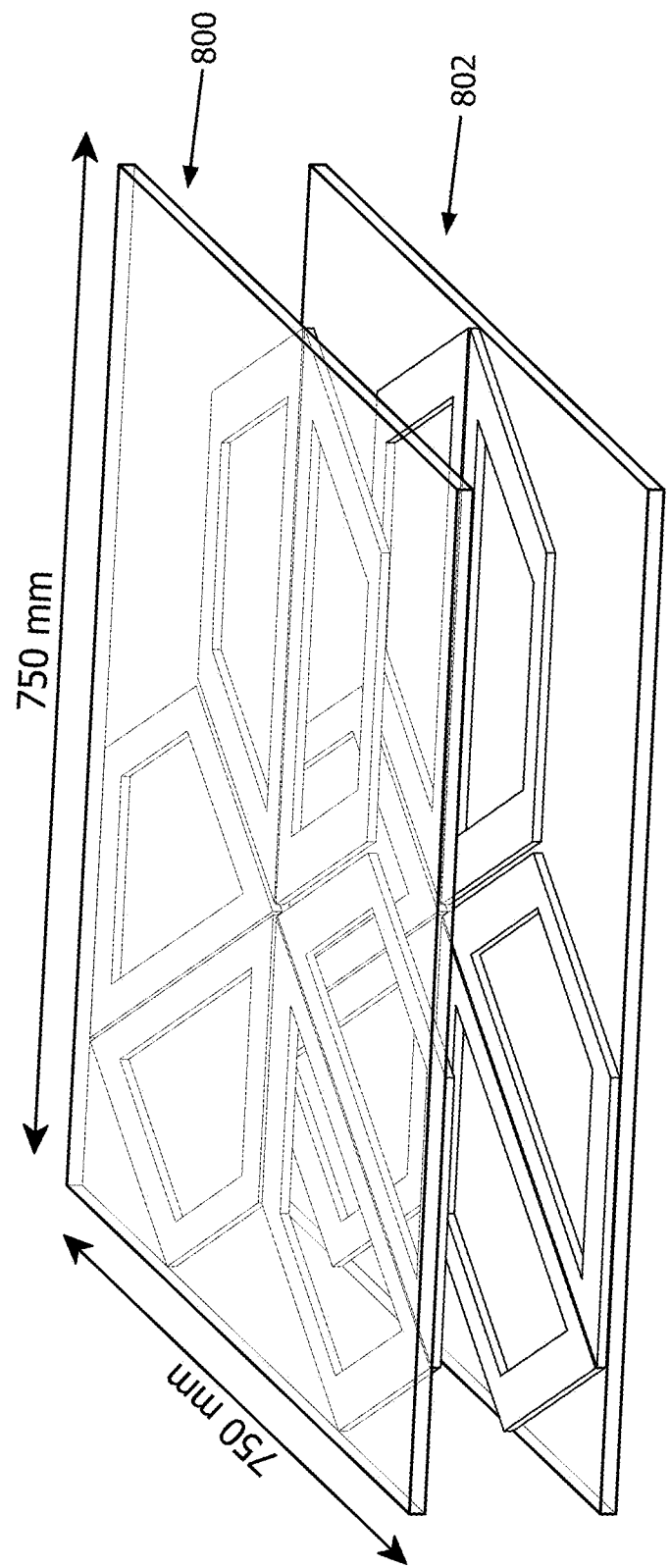
FIG. 8 provides an illustration a 3D model of the present solution.

A 3D model of the proposed coil design was created and the FEA analysis was performed. According to the results, the outer dimensions of each pad 800, 802 obtained as 750 mm x 750 mm and the 3D of the design is given in FIG. 8 for this application. The dimensions can be different for different applications.

Eddy current simulations were performed and the magnetic field density distribution on the secondary side core material is given in FIG. 7. It can be seen from FIG. 7, six DD points 502-512 are formed which help to have magnetically strong coupled pads. The magnetic field density is higher at the long DD paths than at the short DD paths. The self and mutual inductance values are given in the following TABLE I.

TABLE 1

Inductance Results and Design Parameters

| Parameter | Value |
| --- | --- |
| $L_p$ (µH) | 49.7 |
| $L_s$ (µH) | 49.7 |
| M (µH) | 7.57 |
| k | 0.152 |
| $N_p$ | 3 |
| $N_s$ | 3 |
| Airgap (mm) | 125 |

TABLE 1 is provided for illustrative purposes. Other parameter values may be selected in accordance with a given application.

The simulation results show that the disclosed coil design creates two DD points in the half-plane model, where a conventional DD coil has only one point. Thus, the magnetic coupling increases, and the power transfer distance and efficiency are increased as well.

The disclosed coil design produces six DD points in a single design and eliminates the cancellation part of a conventional honeycomb design. The disclosed honeycomb multi-DD coil design also introduces additional opportunities to increase power levels and have higher misalignment tolerances.

In TABLE I, $L_p$, $L_s$, M, k, $N_p$ and $N_s$ show the self-inductance of the primary coil, secondary coil self-inductance, mutual inductance, coupling coefficient, primary coil number of turns and secondary coil number of turns respectively. For the core material, TDK PC95 was selected.

One of the most important challenges for WPT systems is misalignment tolerance as mentioned above. The coupling coefficient value given in TABLE I is for the perfectly aligned coils and k=0.152. The k value is provided for illustrative purposes and can be different for other conditions. To understand the proposed design performance for different positioning of the secondary side, a parametric analysis was performed. The secondary charging pad shifted on the x- and y-axis from 0 cm to 10 cm and the coupling coefficient variation according to this is given in FIG. 9.

Figure 9:
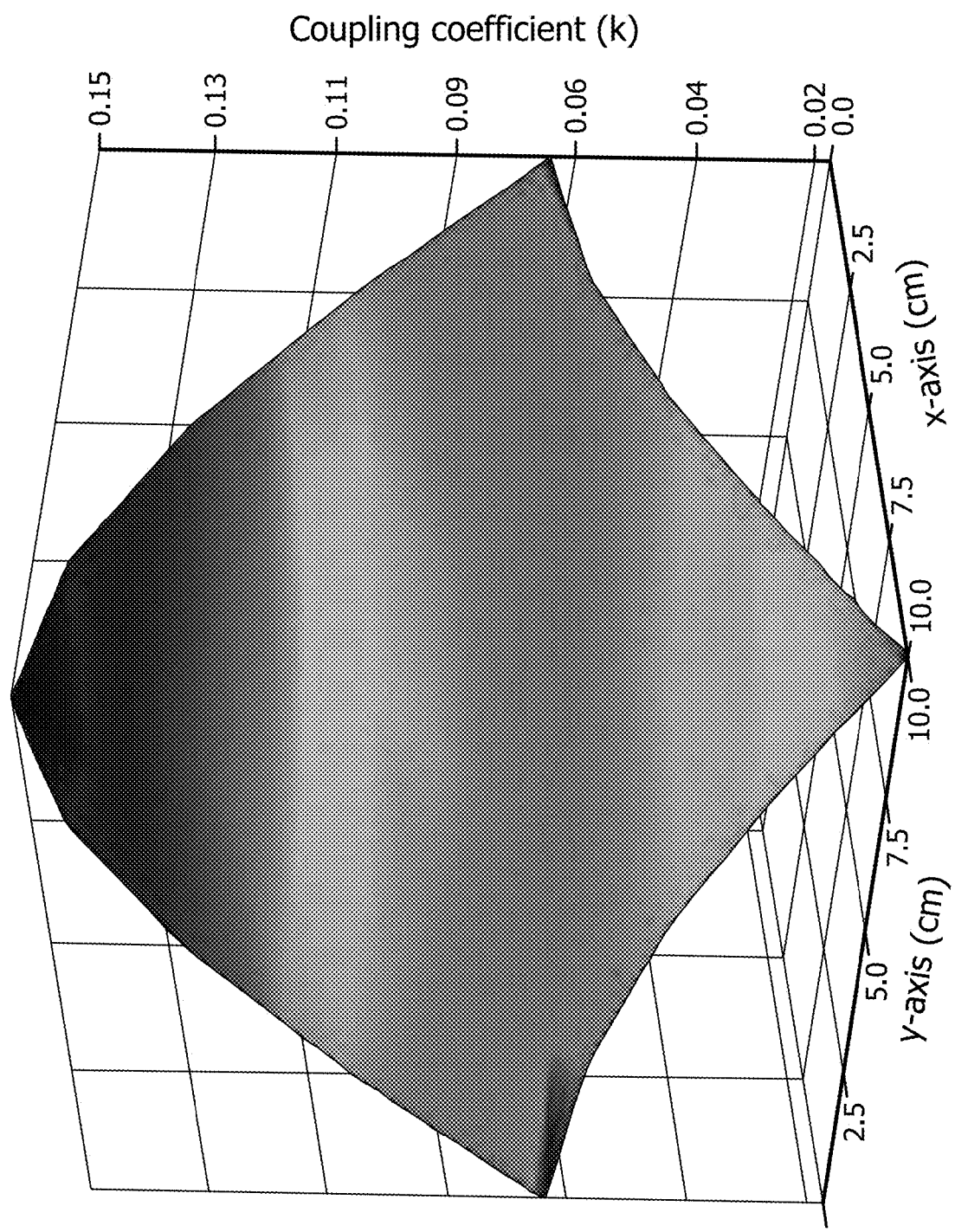
FIG. 9 provides a graph showing the variation of coupling coefficient versus different positioning on the x- and y-axes.

In FIG. 9, it can be seen that there is not a significant decrease in the magnetic coupling of the coils in the red area 900. The misalignment tolerance of the system for 2.5 and 5 cm changes along both axes x and y seems great. The coupling coefficient decreased from 0.152 to 0.11 for a misalignment of 5 cm on both axes. This shows the proposed coil has an excellent misalignment tolerance since the produced magnetic fields are not canceling each.

In order to investigate the electromagnetic compatibility of the proposed coil design with ICNIRP standards, four measurement points are created on the 80 cm side from the center of the charging pads. The maximum value of the magnetic flux density in the scale set as 27 µT according to the maximum allowable exposure value given in the standard and the distribution of the magnetic field at these points are given in FIG. 10.

Figure 10:
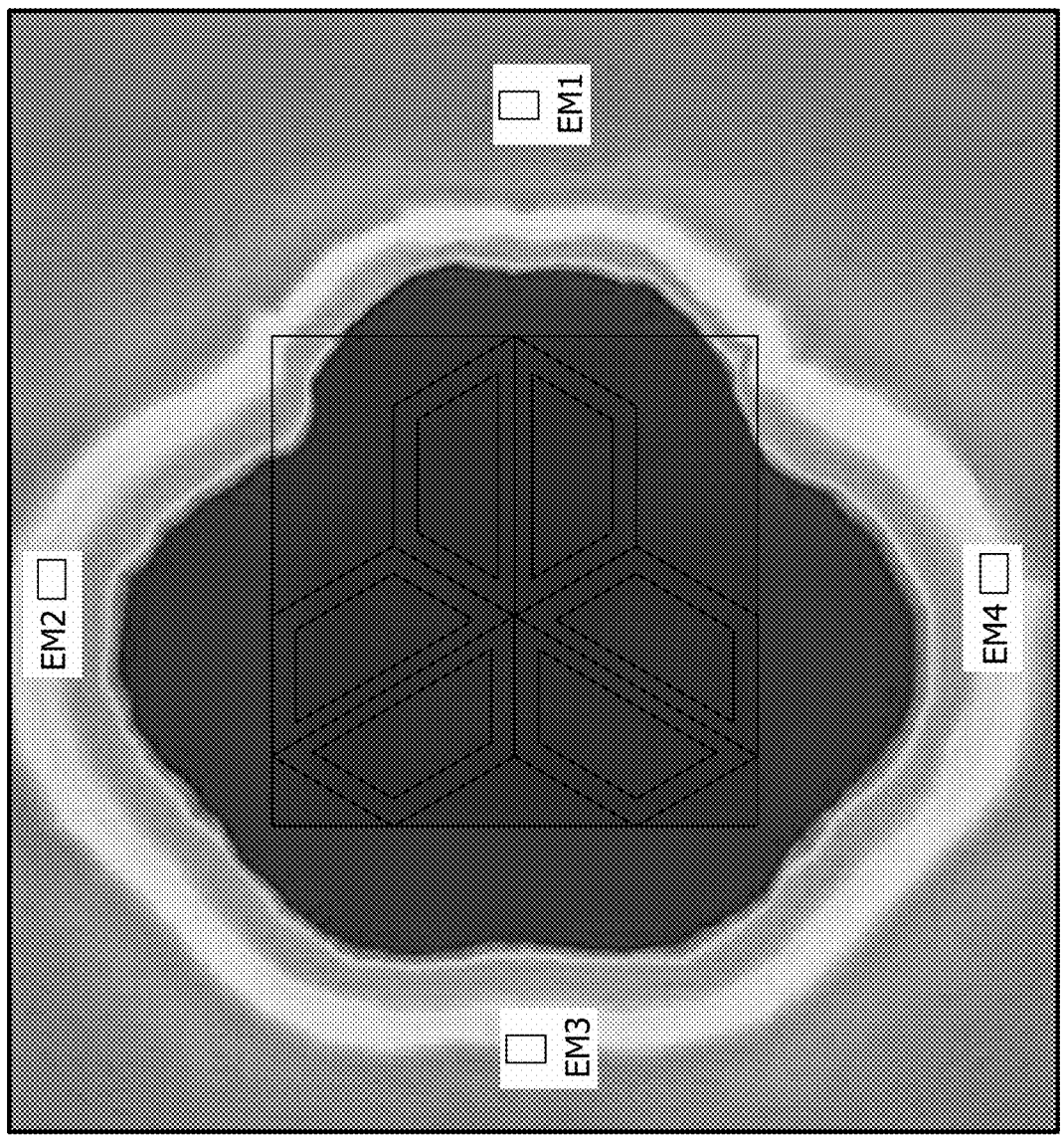
FIG. 10 shows a magnetic field distribution for each EMI point around a charging pad.

In FIG. 10, it can be seen that the magnetic field emission values are lower than 27 µT and these values are given in the following Table II. These results show that, if the charging pad is located under the vehicle chassis towards to low EMI direction, the field values will be extremely low and safe charging can be achieved.

TABLE II

Maximum Magnetic Field Density Values
On The Measurement Points

| Measurement Points | EMI values (µT) |
| --- | --- |
| EM1 | 0.87 |
| EM2 | 9.66 |
| EM3 | 6.17 |
| EM4 | 9.66 |

Figure 11:
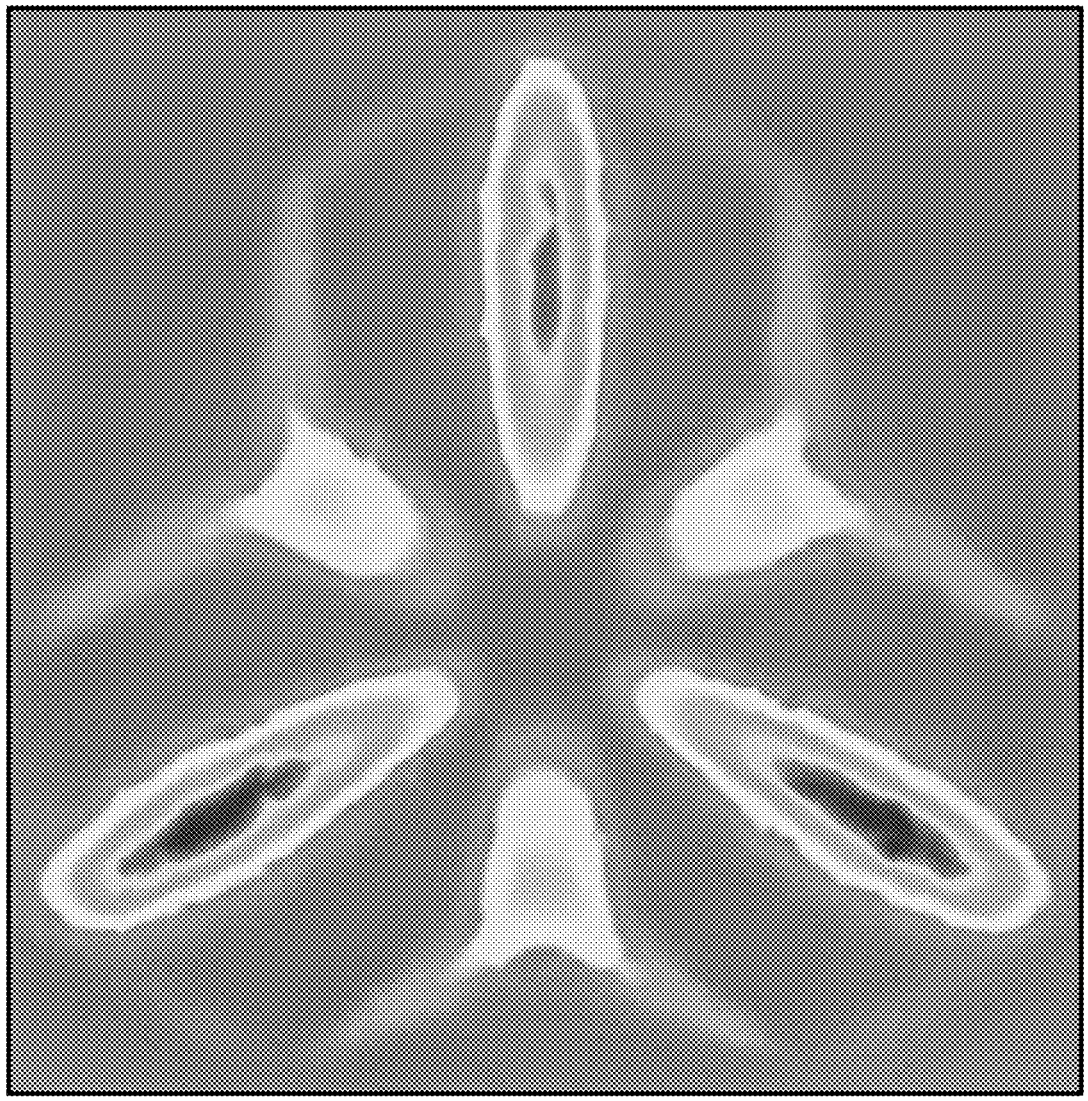
FIG. 11 shows a core loss distribution on the secondary side core material.

The core material provides a low reluctance path for the magnetic flux and a better magnetic coupling. However, it adds core loss and additional parasitic series resistances to the primary and secondary coils. All these consequences depend on the selection of the core geometry, core material, frequency and flux distribution. The total core loss is 120.64 W and strand losses are 105.68 W for the system. The core loss distribution on the secondary side core material is given in FIG. 11. As expected, the losses are higher on the DD paths than on the other parts. Because of the design symmetry, the losses are distributed on the core material well and they are not concentrated in only one portion of it. This helps to prevent heating-up problems in terms of thermal design consideration.

The results show that, the proposed design has a good misalignment tolerance and an extremely low magnetic field at the measurement points. The highest field value is 9.66 µT and the lowest one is just 0.87 µT. The listed values are illustrative results, and the present solution is not limited to these values. Creating 6-DD points in the design not only helps to have a better coupling but also helps to distribute the field density over the core material which is important for thermal design considerations.

Figure 12:
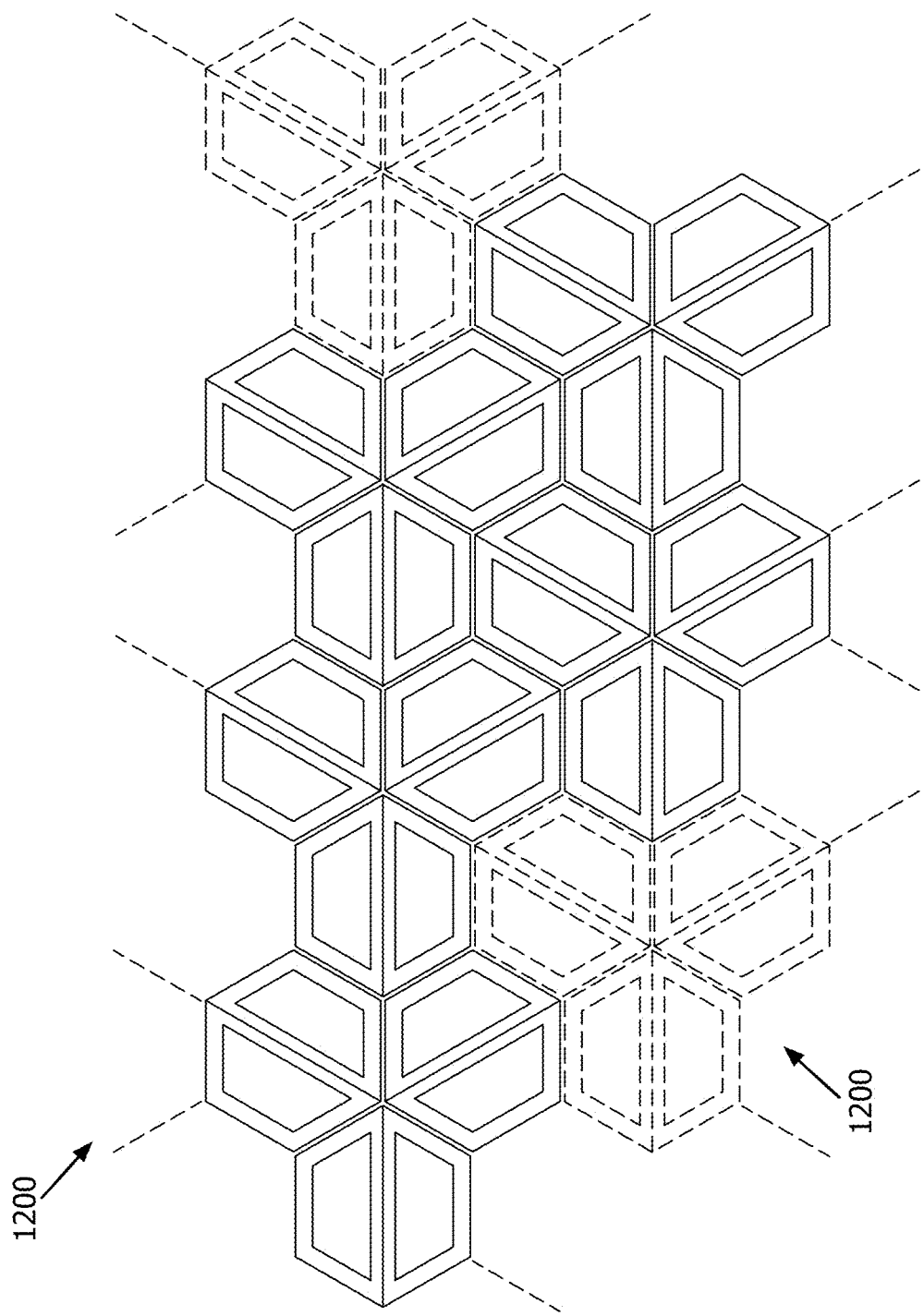
FIG. 12 provides a block diagram showing an illustrative extended honeycomb structure comprising a plurality of the multi-DD coil structure.

FIG. 12 provides an illustration showing an illustrative extended honeycomb structure 1200. The honeycomb structure 1200 comprises a plurality of multi-DD coil structures such as that discussed above.

Figure 13:
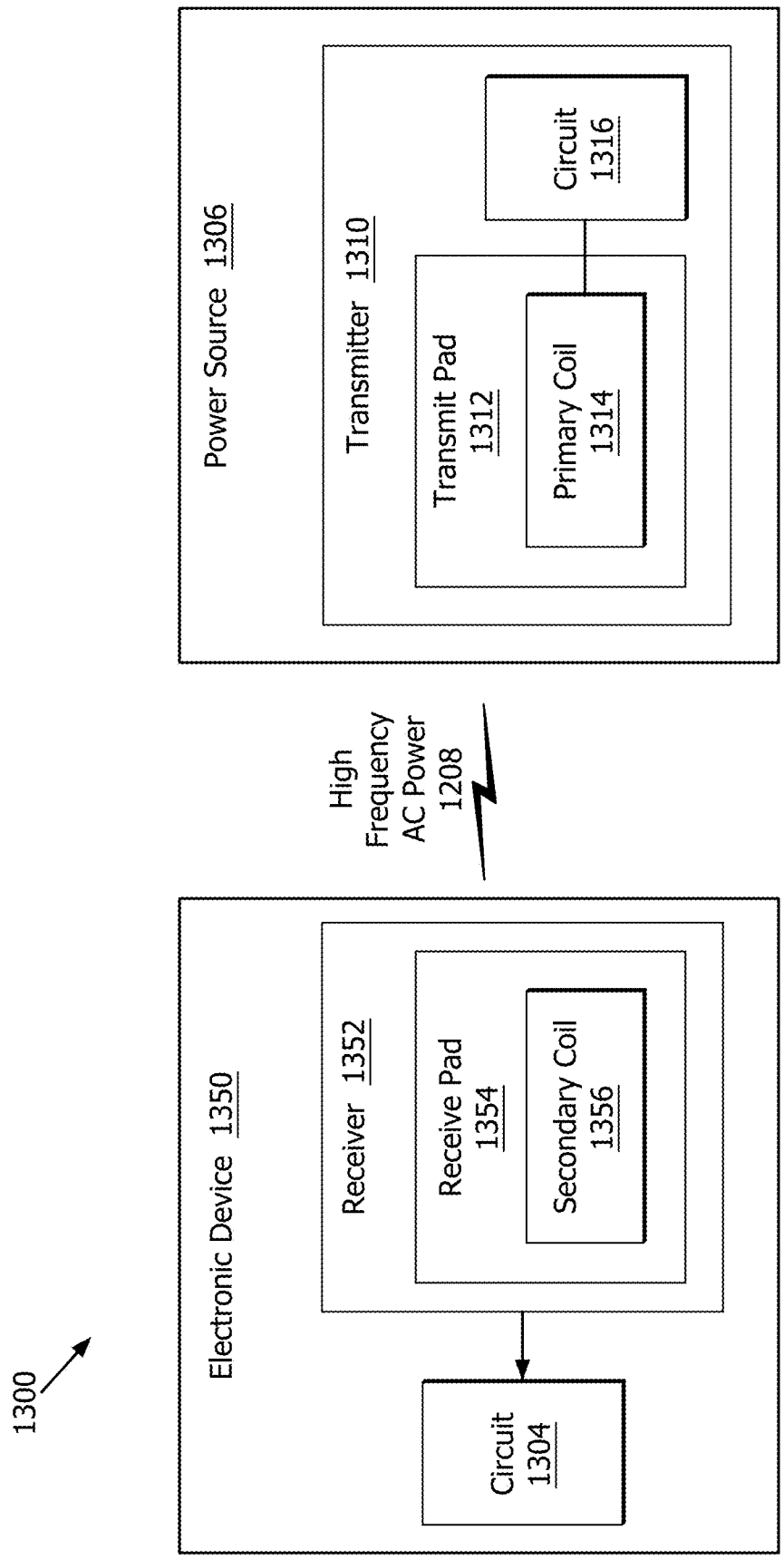
FIG. 13 provides a block diagram of a system implementing the present solution.

FIG. 13 provides a block diagram showing a system 1300 implementing a WPT system according to the present solution. System 1300 comprises an electronic device 1350 and a power source 1306. Electronic device 1350 can include, but is not limited to, an electric vehicle, a robot or other electric mobile platform. System 1300 is configured to facilitate the wireless provision of high-frequency AC power 1308 from the power source 1306 to an internal circuit 1304 of the electronic device 1300. A fundamental frequency of the high-frequency AC power may be any frequency. For example, the fundamental frequency of the high-frequency AC power may be in a range of 10-100 kHz. For example, the fundamental frequency is typically about 85 kHz. The present solution is not limited to the listed fundamental frequencies.

The power source 1306 comprises a transmitter 1310 with a transmit pad 1312. The transmit pad 1312 is configured to transmit the high frequency AC power therefrom. In this regard, the transmit pad 1312 comprises a primary coil 1314 connected to a circuit 1316. Primary coil 1314 may be the same as or similar to coil $L_1$ is FIG. 3, and/or circuit 1316 may comprise power source 302 of FIG. 3 and the transistor active bridge circuit 304 of FIG. 3. Circuit 1316 can include other passive and/or active electronic device in accordance with any given application. In this regard, circuit 1316 may comprise an inverter configured to receive a DC voltage from a DC voltage source, and convert the DC voltage to a high-frequency AC voltage. The inverter is electrically connected to the transmit pad 1312 so that the high-frequency AC voltage can be used to induce a high-frequency AC current in the primary coil, whereby the high-frequency AC power is wirelessly transferred through an open air environment. In addition, this environment can also be another medium, such as water and other magnetically transparent medium.

The electronic device 1350 comprises a receiver 1352 with a receive pad 1354. The receive pad 1354 is configured to wirelessly receive the high frequency AC power 1308 when adjacent to, near or otherwise in proximity to the transmit pad 1312. In this regard, the receiver pad 1354 comprises a secondary coil 1356 connected to circuit 1304. Secondary coil 1356 may be the same as or similar to coil $L_2$ is FIG. 3, and/or circuit 1304 may comprise the rectifier circuit 306 and load 308 of FIG. 3. Circuit 1304 can include other passive and/or active electronic device in accordance with any given application. In this regard, circuit 1304 may comprise a rectifier configured to receive high-frequency AC voltage corresponding to high-frequency AC current induced in the pick-up coil as a result of the wireless transfer of the high-frequency AC power, and convert the high-frequency AC voltage to a DC voltage to be output to a load of the electric device 1350.

As evident from the above discussion, the present solution concerns a coil that comprises a wire wound to form a plurality of DD sub-coils. Each DD sub-coil has a plurality of sides defining one of a plurality of hexagonal shaped segments arranged to define a honeycomb structure. A magnetic field is created when current passes through the plurality of DD sub-coils. The plurality of DD sub-coils are configured so that when activated the current flows in a same first direction through adjacent sides of first and second ones of the plurality of DD sub-coils, flows in a same second direction through adjacent sides of first and third ones of the plurality of DD sub-coils, and flows in a same third direction through adjacent sides of the second and third ones of the plurality of coils.

Each of the plurality of hexagonal shaped segments comprises a plurality of concentric hexagonal structures formed by the wire. Each hexagonal structure of the plurality of concentric hexagonal structures comprises a first half defined by a first plurality of concentric quadrilateral shaped structure formed by the wire and a second half defined by a second plurality of concentric second quadrilateral shaped structure formed by the wire. The hexagonal structure is configured such that: when activated the current flows in a same direction through adjacent sides of the first and second halves thereof; and current flows in a first direction in the first half and an opposite second direction in the second half.

Each of the plurality of DD sub-coils may be rotated by +120° or −120° relative to another adjacent one of the plurality of DD sub-coils. The DD sub-coils collectively may comprise a single wound wire.

The present solution also concerns a WPT system for wirelessly providing high-frequency AC power to a load. The WPT system comprises: a transmitter comprising a transmitter pad configured to wirelessly transfer the high-frequency AC power, the transmitter pad comprising a first coil; and a receiver comprising a receiver pad configured to receive the high-frequency AC power when the transmitter pad and the receiver pad are disposed adjacent to each other and spaced apart by a gap, the receiver pad comprising a second coil. Each of the first and second coils comprises a wire wound to form a plurality of DD sub-coils, each said DD sub-coil having a plurality of sides defining one of a plurality of hexagonal shaped segments arranged to define a honeycomb structure. A magnetic field is created when current passes through the plurality of DD sub-coils. The plurality of DD sub-coils are configured so that when activated the current flows in a same first direction through adjacent sides of first and second ones of the plurality of DD sub-coils, flows in a same second direction through adjacent sides of first and third ones of the plurality of DD sub-coils, and flows in a same third direction through adjacent sides of the second and third ones of the plurality of coils. The transmitter may be located on or in the power source, and the receiver is located on or in the load. The load may include, but is not limited to, an electric vehicle.

Each of the plurality of hexagonal shaped segments comprises a plurality of concentric hexagonal structures formed by the wire. Each hexagonal structure of the plurality of concentric hexagonal structures comprises a first half defined by a first plurality of concentric quadrilateral shaped structure formed by the wire and a second half defined by a second plurality of concentric second quadrilateral shaped structure formed by the wire. The hexagonal structure is configured such that when activated: the current flows in a same direction through adjacent sides of the first and second halves thereof; and/or current flows in a first direction in the first half and an opposite second direction in the second half.

Each of the plurality of DD sub-coils may be rotated by +120° or −120° relative to another adjacent one of the plurality of DD sub-coils. The DD sub-coils may collectively comprise a single wound wire.

The transmitter may comprise an inverter configured to receive a DC voltage from a DC voltage source, and convert the DC voltage to a high-frequency AC voltage. The transmitter pad may be configured to use the high-frequency AC voltage to induce a high-frequency AC current in the first coil. The receiver may comprise a rectifier configured to receive high-frequency AC voltage corresponding to high-frequency AC current induced in the second coil as a result of the wireless transfer of the high-frequency AC power, and convert the high-frequency AC voltage to a DC voltage to be output to the load. A fundamental frequency of the high-frequency AC power may be in a range of 10-10 MHz. For example, the fundamental frequency is about 85 kHz. The present solution is not limited in this regard.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

What is claimed is:

1. A coil, comprising:
a wire wound to form a plurality of double-D (DD) sub-coils, each said DD sub-coil having a plurality of sides defining one of a plurality of hexagonal shaped segments arranged to define a honeycomb structure;
wherein a magnetic field is created when current passes through the plurality of DD sub-coils, the plurality of DD sub-coils being configured so that when activated the current flows in a same first direction through adjacent sides of first and second ones of the plurality of DD sub-coils, flows in a same second direction through adjacent sides of first and third ones of the plurality of DD sub-coils, and flows in a same third direction through adjacent sides of the second and third ones of the plurality of coils;
wherein each of the plurality of hexagonal shaped segments comprises a plurality of concentric hexagonal structures formed by the wire; and
wherein each hexagonal structure of the plurality of concentric hexagonal structures further comprises a first half defined by a first plurality of concentric quadrilateral shaped structure formed by the wire and a second half defined by a second plurality of concentric second quadrilateral shaped structure formed by the wire.

2. The coil according to claim 1, wherein the hexagonal structure is configured such that when activated the current flows in a same direction through adjacent sides of the first and second halves thereof.

3. The coil according to claim 1, wherein the hexagonal structure is configured such that when activated current flows in a first direction in the first half and an opposite second direction in the second half.

4. The coil according to claim 1, wherein each of the plurality of DD sub-coils is rotated by +120° or −120° relative to another adjacent one of the plurality of DD sub-coils.

5. The coil according to claim 1, wherein the plurality of DD sub-coils collectively comprise a single wound wire.

6. A wireless power transfer (WPT) system for wirelessly providing high-frequency AC power to a load, the WPT system comprising:

a transmitter comprising a transmitter pad configured to wirelessly transfer the high-frequency AC power, the transmitter pad comprising a first coil; and a receiver comprising a receiver pad configured to receive the high-frequency AC power when the transmitter pad and the receiver pad are disposed adjacent to each other and spaced apart by a gap, the receiver pad comprising a second coil;

wherein each of the first and second coils comprises a wire wound to form a plurality of double-D (DD) sub-coils, each said DD sub-coil having a plurality of sides defining one of a plurality of hexagonal shaped segments arranged to define a honeycomb structure; and wherein a magnetic field is created when current passes through the plurality of DD sub-coils, the plurality of DD sub-coils being configured so that when activated the current flows in a same first direction through adjacent sides of first and second ones of the plurality of DD sub-coils, flows in a same second direction through adjacent sides of first and third ones of the plurality of DD sub-coils, and flows in a same third direction through adjacent sides of the second and third ones of the plurality of coils;

wherein each of the plurality of hexagonal shaped segments comprises a plurality of concentric hexagonal structures formed by the wire; and wherein each hexagonal structure of the plurality of concentric hexagonal structures further comprises a first half defined by a first plurality of concentric quadrilateral shaped structure formed by the wire and a second half defined by a second plurality of concentric second quadrilateral shaped structure formed by the wire.

7. The WPT system according to claim 6, wherein the transmitter is located on or in the power source, and the receiver is located on or in the load.

8. The WPT system according to claim 6, wherein the load comprises an electric vehicle.

9. The WPT system according to claim 6, wherein the hexagonal structure is configured such that when activated the current flows in a same direction through adjacent sides of the first and second halves thereof.

10. The WPT system according to claim 6, wherein the hexagonal structure is configured such that when activated current flows in a first direction in the first half and an opposite second direction in the second half.

11. The WPT system according to claim 6, wherein each of the plurality of DD sub-coils is rotated by +120° or −120° relative to another adjacent one of the plurality of DD sub-coils.

12. The WPT system according to claim 6, wherein the plurality of DD sub-coils collectively comprise a single wound wire.

13. The WPT system according to claim 6, wherein:
the transmitter comprises an inverter configured to receive a DC voltage from a DC voltage source, and convert the DC voltage to a high-frequency AC voltage;
the transmitter pad is configured to use the high-frequency AC voltage to induce a high-frequency AC current in the first coil;
the receiver comprises a rectifier configured to receive high-frequency AC voltage corresponding to high-frequency AC current induced in the second coil as a result of the wireless transfer of the high-frequency AC power, and convert the high-frequency AC voltage to a DC voltage to be output to the load.

14. The WPT system according to claim 6, wherein a fundamental frequency of the high-frequency AC power is in a range of 10-100 kHz.

15. The WPT system according to claim 6, the fundamental frequency is about 85 kHz.

* * * * *